Nov. 25, 1969 M. S. SHEBANOW 3,480,930

RECORD PROCESSING APPARATUS

Filed June 21, 1965 5 Sheets-Sheet 1

INVENTOR
MICHAEL S. SHEBANOW
BY Fred Jacob
ATTORNEY

INVENTOR
MICHAEL S. SHEBANOW
BY Fred Jacob
ATTORNEY

INVENTOR
MICHAEL S. SHEBANOW
BY Fred Jacob
ATTORNEY

Nov. 25, 1969 M. S. SHEBANOW 3,480,930

RECORD PROCESSING APPARATUS

Filed June 21, 1965 5 Sheets-Sheet 4

INVENTOR
MICHAEL S. SHEBANOW
BY Fred Jacob
ATTORNEY

INVENTOR
MICHAEL S. SHEBANOW
BY Fred Jacob
ATTORNEY

3,480,930
RECORD PROCESSING APPARATUS

Michael S. Shebanow, Medfield, Mass., assignor to Honeywell Inc., Minneapolis, Minn., a corporation of Delaware Filed June 21, 1965, Ser. No. 465,690
Int. Cl. G11b 5/00
U.S. Cl. 340—174.1 33 Claims

ABSTRACT OF THE DISCLOSURE

A random access system for storing and processing rectangular cards having information stored thereon in tracks. The cards are suspended in a vertical storage position above a reference surface by holding rods which cooperate with notches in the side edges of the cards and by a set of selection rods having particular cross-sections designed to cooperate with notches in the top major edges of the cards. Rotation of the selection rods in accordance with an address code permits any selected card to drop to the reference surface, whereupon the card is accelerated along a raceway by an impelling bar to a revolving vacuum capstan. As the card is rotated by a capstan, it passes by a read station adjacent to the capstan and the desired data transfer is effected at the rate of one track per revolution. Upon completion of data transfer the card is released and propelled down a return raceway to a second decelerating capstan. A lift plate is provided to receive the decelerated card from the second capstan and return it to a storage position at the end of the stack.

The present invention relates in general to new and improved unit record processing apparatus, in particular to apparatus wherein the unit records are randomly accessible for data transfer operations.

While it is not so limited, the invention is applicable and will be explained with reference to apparatus wherein the unit records take the form of flexible cards or tape strips. In one practical embodiment of the invention, the cards include at least one surface of magnetic material on which data may be stored in the form of discrete magnetized spots located along a plurality of substantially parallel tracks. Equipment of this type is normally associated with a data processing system which is capable of operating at very high speeds. Accordingly, it is important for the individual cards to be selected rapidly from a deck or stack of cards when called for. The selected card must be transported at a predetermined speed past a processing station where the desired data transfer is carried out and must, thereafter, be quickly returned to the deck. It is necessary that these operatons be carried out as rapidly as possible so that the card is again available in the deck for selection.

Prior art unit record processing equipment of the type described, has met with only moderate success owing to the limited record processing rates heretofore attainable. The length of each record processing cycle wherein the cards is selected from the deck, transported past the data transfer station and is subsequently returned to the deck, is relatively large in such equipment. In particular, the selection of a card takes up a large portion of the overall processing cycle. Conventionally, the cards are suspended in their normal storage location. The chosen card is selectively dropped and must completely clear the adjacent suspended cards before the data transfer operation can be effected. Thus, the time required for the card to clear the adjacent cards in free fall is an irreducible portion of each card processing cycle in such equipment.

It is a primary object of the present invention to provide unit record processng equipment wherein the random access selection of the record requires only a fraction of the interval necessary for the selected record to clear the adjacent suspended records in free fall.

In prior art card processing equipment of the type described, the cards are normally held suspended at a storage location, as described above. In such a case, all motion of a selected card takes essentially place in a vertical plane, except for two 180° reversals of motion. In the absence of a positive controlling force, card positioning in a horizontal direction is therefore imprecise. As a consequence, considerable positional latitude must be allowed at the data transfer station, which prevents a close spacing of successive data tracks on the magnetized card surface at the expense of card storage capacity.

It is a further object of the present invention to provide unit record processing apparatus of the type described, wherein the selected card constantly moves in positive edge contact with a reference surface until it is returned to its normal storage location.

In heretofore available card processing equipment of the type described, the return path of the card is primarily in an upward direction, so that gravity tends to dissipate the momentum of the card. It is sometimes necessary to insert a booster to move the returning card past the peak of its return path. The time of card travel is therefore not precisely fixed. A further disadvantage inherent in such an arrangement is the relatively long time interval required for the card to travel from the data transfer station to the storage location, which limits the overall card processing rate.

It is another object of the present invention to provide card processing apparatus which employs a relatively short card path and wherein the velocity of the record throughout the entire return path is carefully controlled.

Where cards having one magnetic surface are employed, account must be taken of the fact that this surface is sensitive to friction or abrading action normally encountered by the card in its travel.

It is still another object of the present invention to provide magnetic card processing apparatus wherein the magnetized surface of each of the cards is protected against wear throughout the movement of a selected record.

Similarly, where the cards are suspended in a normal storage location, e.g., by means of notches in each card which engage appropriate selection rods, the notch area in particular must be protected from damage.

It is yet another object of the present invention to provide card processing apparatus wherein the notch area of each card remains free from aggressive physical contact throughout the travel of the card.

The card selection interval, however abbreviated, remains substantial due to the requirement for the card to travel in free fall.

It is another object of the present invention to provide card processing apparatus wherein the card selection step may be overlapped in time with the processing of the previously selected card so that a selected card is available for processing virtually immediately when called for.

In order to achieve reliable operation of the equipment discussed hereinabove, it is important that suitable check points be established to govern the movement of the selected card within its transport path. Quite apart from the pre-selection step discussed above, more than one card may simultaneously be cycling in the card path in order to speed up the overall operation. To this end, it may be desirable to retain a card at the processing station for a longer time interval than is required for the data transfer alone. The reason for so delaying the return of the unit record may be to avoid a jam with the preceding card in the path.

Accordingly, it is yet a further object of the present invention to provide unit record processing equipment of the type described hereinabove wherein suitable interlocks are provided to permit a high card processing rate coupled with fail-safe operation.

These and other objects of the present invention, together with the features and advantages thereof, will become apparent from the following detailed specification in conjunction with the following drawings in which.

Figure 1:
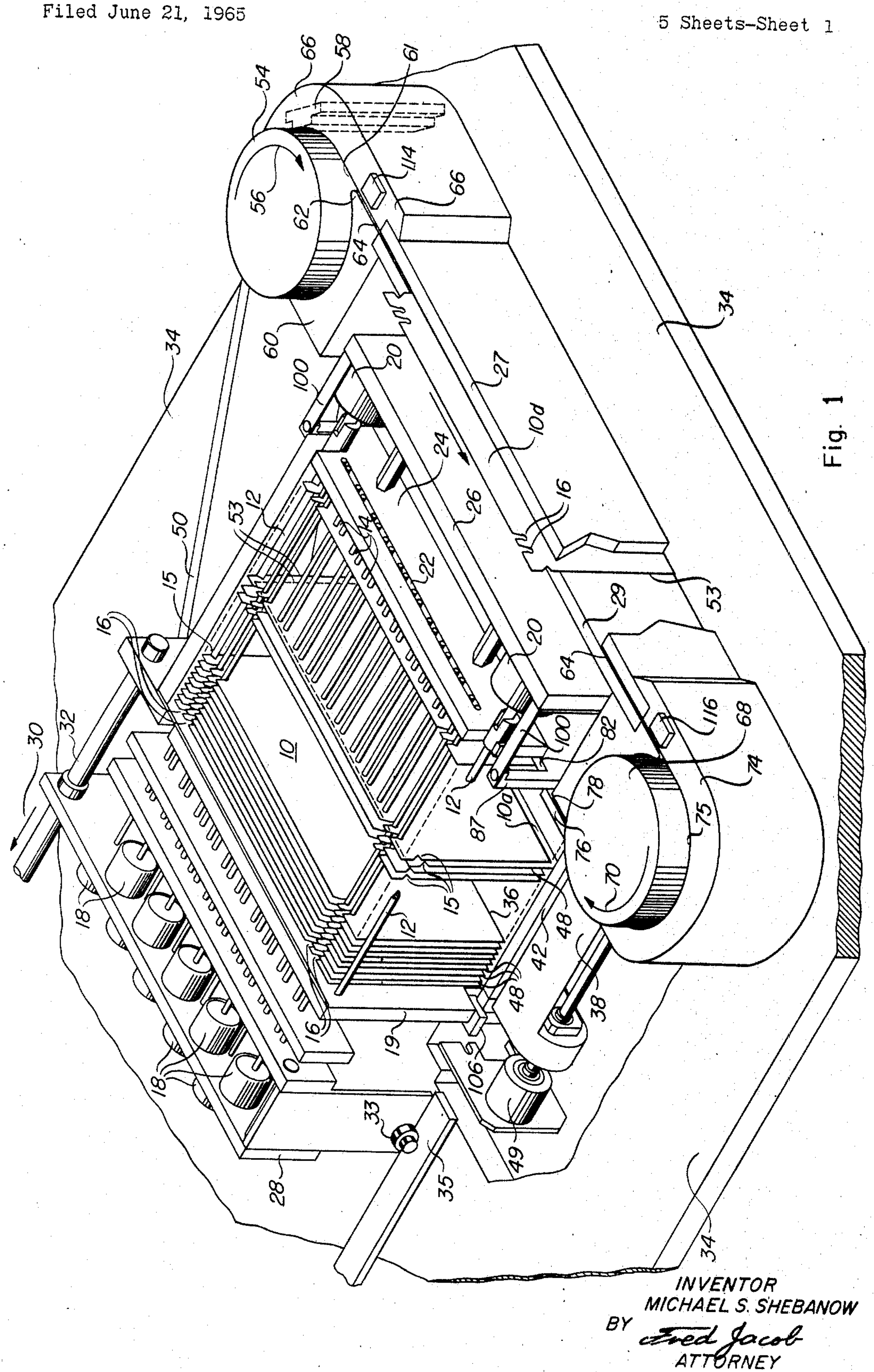
FIGURE 1 is an overall view of a preferred embodiment of the present invention.

With reference now to the drawings, a deck of unit records in the form of substantially rectangular cards or tape strips 10, is seen to be suspended on a plurality of rods. Each card preferably has one magnetizable surface which faces a plate 19 in FIGURE 1. Each card further includes a conductive coating on its other surface in order to dissipate static charges. A pair of holding rods 12 engages appropriate notches 15 in the minor or side edges of the cards, while successive pairs of selection rods 14 engage corresponding slots 16 in the upper or major edge of each card. In practice, the cards 10 are distributed along the entire length of the rods, forward of the plate 19, the distribution shown in FIGURE 1 having been adopted in order to illustrate pertinent portions of the subject invention. It will also be understood that the cards are ordinarily stacked closer than can be faithfully represented in the drawings. The notches 16 are arranged in successive pairs along the entire length of the upper edge of each card, but have not been fully shown in the drawings for the sake of simplicity. The ends of the rods 14 are supported in a common slot 22. The latter is located in a support plate 24, which is itself fastened to a plate 26. The rods 14 and 12 are rotatably supported and are adapted to be turned by corresponding solenoid actuators 18 and 20 respectively.

The notches 16 preferably have one of two possible configurations, so as to uniquely define binary address code of each card. As seen from the number of actuators 18, a 10-digit code defines each address. The cross section of each selection rod is such that in one of its two positions the rod is adapted to engage the corresponding notch 16 in supporting relationship if the notch has the proper configuration. Each holding rod and each selection rod has a relieved portion near its forward end, enabling it to accept card notches in any position of the rod. The rods 14 and 12 may be rotated out of supporting relationship with the notches upon the energization of the corresponding actuators. Thus, a card may be released at random from the rods and dropped onto the surface below, as shown at 10*a* in FIGURE 1.

The actuators 18 are positioned on a common supporting carriage 28, which is adapted to be moved in the direction of the arrow 30 when it is desired to withdraw the rods 14 in order to replace the deck of cards 10. The requisite force is applied to the rod 32 and the movement of the carriage 28 is determined by a pair of rollers 33 and corresponding guide rails 35, positioned on opposite sides of the carriage.

The cards are normally suspended on the rods above a reference plane, which is determined by a planar working surface 34. The lower major edges 36 of the suspended cards are equally spaced from the reference plane, the cards hanging substantially normal to said plane. A pair of photocells 108 and 110 are positioned so as to monitor the space between the card edges 36 and the reference surface 34. The term photocell, as employed herein, is broadly directed to sensing means. For example, the cells 108 and 110 may include respective light sources as well as the actual sensing device, all located in the plate 19 and adapted to detect the presence of a dropped card by reflection. Alternatively, the light sources alone may be located in the plate 19, while the sensing devices may be positioned opposite and spaced therefrom. In the latter case, a card is detected when the light beams are interrupted.

Figure 2:
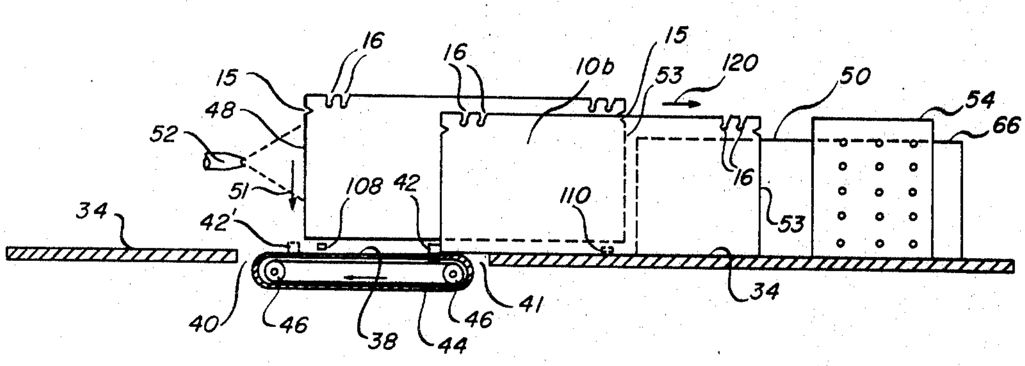
FIGURE 2 illustrates in elevation view pertinent portions of the apparatus of FIGURE 1 and its operation.
Figure 3:
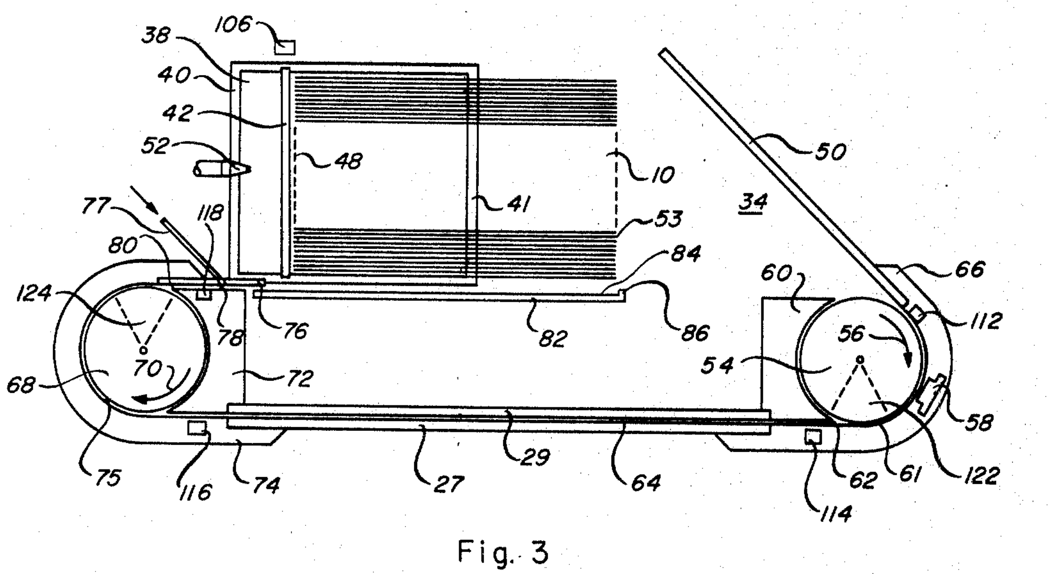
FIGURE 3 illustrates in plan view the apparatus of FIGURE 2.

As best shown in FIGURE 2, a waiting platform 38 includes a planar portion that lies in the aforesaid reference plane. The platform 38 constitutes a surface that closes on itself and is seen to be spaced lengthwise from the working surface 34, as indicated at 40 and 41. The width of the platform is such that it spans the entire stack of cards suspended thereabove. An impelling bar 42 spans the width of the platform 38, as best shown in FIGURES 1 and 3, its height permitting it to pass below the edges 36 of the suspended cards. The impelling bar is fastened at each end to one of a pair of belts 44 which run on a pair of pulleys 46.

A servo motor 49 is adapted to drive the pulleys in the direction shown to cause the impelling bar 42 to traverse the length of the platform 38, using the latter as a guide. At the end of the platform, the impelling bar passes through the space 41 and, as part of a single continuous action, it returns below the platform through the opposite space 40 to its original start or rest position. The latter is shown in FIGURES 1 and 3 and is further indicated at 42' in FIGURE 2. The start position is accurately determined by the operation of a servo motor 49 which may itself be controlled from a servo circuit. The rest position of the bar 42 is seen to be immediately in front of the minor card edges 48. A photocell 106 is positioned to detect the presence of the bar 42 in the rest position.

As previously explained, in actual practice the cards are stacked for closer than can be faithfully represented in the drawings. In order to prevent their clinging together, an air current may be applied from a nozzle 52, positioned as shown in FIGURE 2. The nozzle may be stationary, or it may reciprocate in order to keep the cards from becoming bunched at the limits of the card deck. These limits are defined at one end by the aforesaid plate 19 and at the other end by a mechanical gate whose function is explained in detail below.

A guide 50 is positioned substantially normal to the working surface 34 and presents a guide surface extending between the card deck 10 and a vacuum read capstan 54. The external surface of the read capstan 54 is seen to contain perforations through which a vacuum may be applied internally of the capstan in order to retain a card in contact with the external surface. The read capstan is adapted to rotate at a constant speed in the direction of the arrow 56, so as to transport a card held in contact therewith past a data transfer station 58 at a predetermined velocity. In a preferred embodiment of the invention, the data transfer station includes a plurality of magnetic heads, each adapted to confront a different track of the aforesaid magnetizable card surface.

The surface of the guide 50 which is presented to the cards is continued in a guide structure 66 which abuts the guide 50. A photocell 112 is positioned on the guide structure 66 and is adapted to detect the arrival of a card at the read capstan. The guide structure 66 and an additional guide structure 60 present curved surfaces to the read capstan 54, to form an internal raceway 61 in cooperation with the external read capstan surface. An external raceway 64 is formed by a pair of closely spaced, parallel guide plates 27 and 29. A card designated 10*d* is shown positioned in the broken off raceway in FIGURE 1 to expose the card. The plates 27 and 29 continue the surfaces of the internal raceway 61.

The intersection between the raceways 61 and 64 is formed by a rounded ridge 62. A photocell 114 is positioned on the guide structure 66 to detect the departure of a card from the read capstan. A photocell 116 is positioned along the raceway 64, a predetermined distance downstream from the cell 114 and is adapted to detect the presence of a card at that point.

The raceway surfaces of plates 29 and 27 are continued by a pair of guide structures 72 and 74 respectively. The last-mentioned guide structures form an internal raceway 75 with the external surface of a vacuum return capstan 68. The capstan 68 is similarly constructed to retain a card on its external surface by the application of vacuum pressure and is adapted to rotate in the direction of the arrow 70 at a constant speed, which is less than the speed of the read capstan 54 in a preferred embodiment of the invention. A plate 76 forms an external raceway 78 with the aforesaid guide structure 72, a rounded ridge 80 being positioned at the intersection of the raceways 75 and 78. An air conduit 77 extends through the plate 76 such that an air jet may be directed into the raceway 78. A photocell 118 is positioned on the guide structure 72 and is adapted to detect the presence of a card in the raceway 78. It will be noted that the aforesaid guide structures, particularly those defining the internal raceways, do not reach to the height of the notches 16 of the card 10*d*. The reason for this construction will become apparent in connection with the discussion below of the operation of the subject invention.

Figure 4:
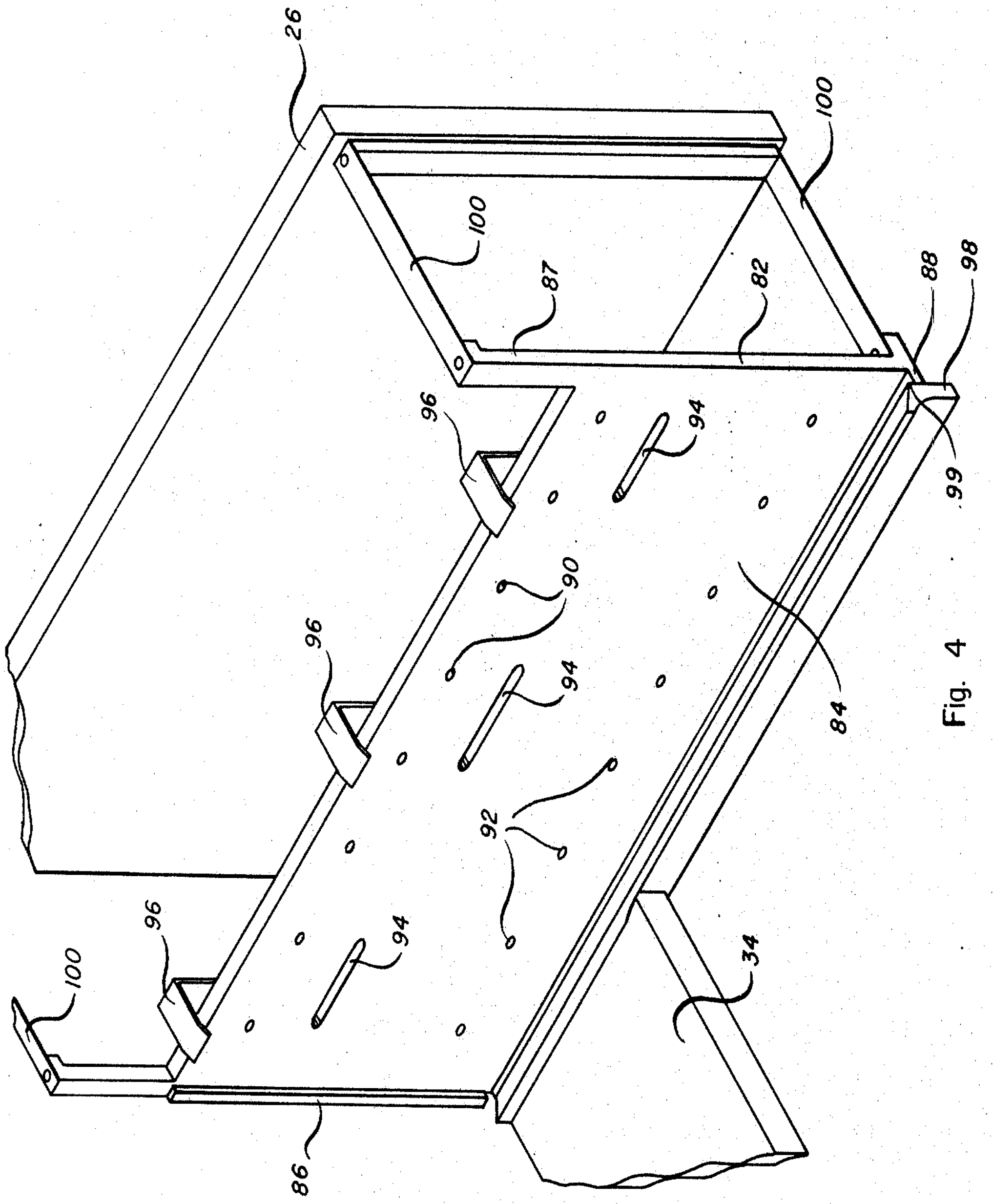
FIGURE 4 illustrates in greater detail a component of the apparatus of FIGURE 1.
Figure 5B:
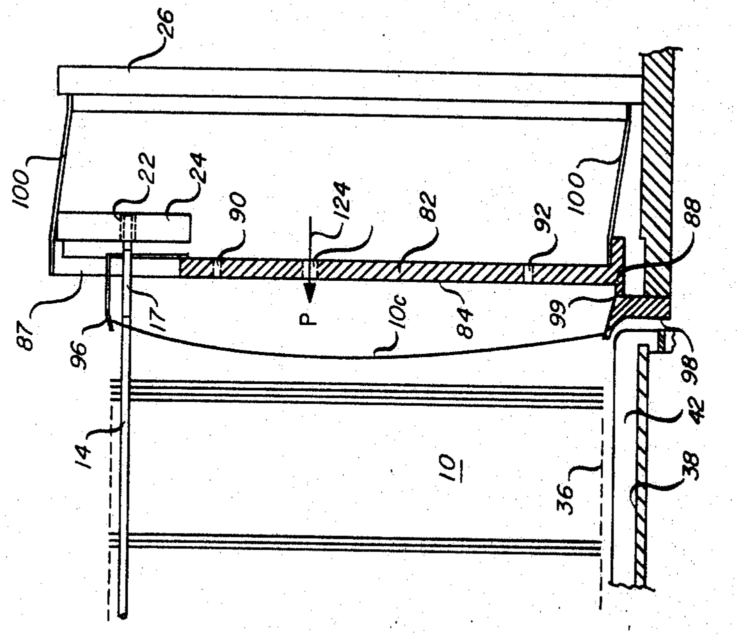
FIGURE 5 illustrates the operation of a portion of the apparatus of FIGURE 1.
Figure 5A:
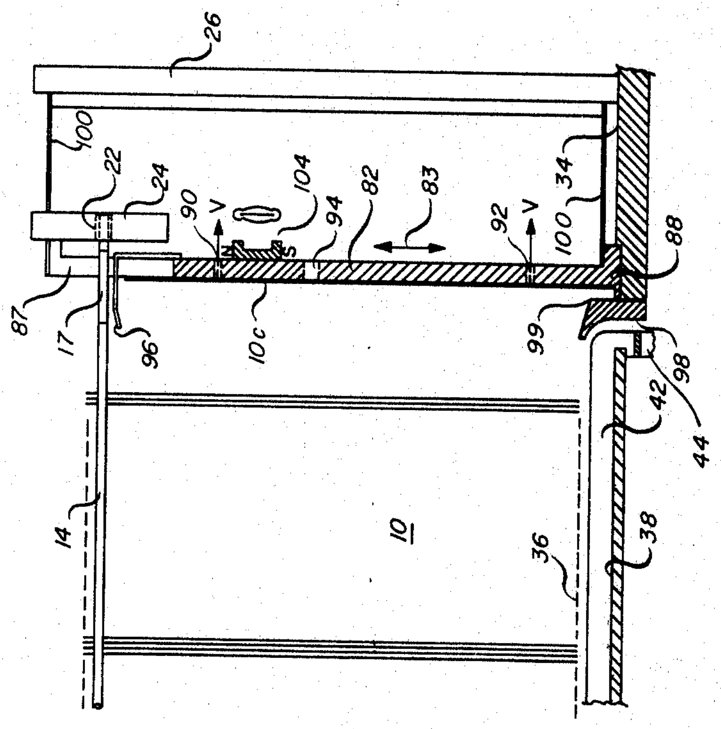

A lift plate 82, shown in greater detail in FIGURES 4 and 5, has a surface 84 which is seen to be aligned with one surface of the raceway 78. The plate surface 84 is substantially normal to the reference plane and is parallel to the suspended cards of the deck 10. The lift plate includes a backstop 86, as well as a pair of extension arms 87. The plate further includes a shelf 88, normal to the surface 84. The lift plate is supported on two pair of flexures 100, fastened to the arms 87 and to the shelf 88 at opposite sides of the plate. The flexures are further attached to a pair of shoulders of the stationary plate 26 and permit motion of the lift plate substantially in the direction of the arrow 83. A sensing switch 104 is located so as to detect the position of the plate 82 relative to the working surface 34. When the lift plate is in its normal position, as shown in FIGURE 5A, the shelf 88 is seen to lie in the working surface 34, coplanar therewith.

The plate surface 84 contains an upper and a lower row of holes 90 and 92 respectively, through which vacuum pressure may be applied from the rear of the surface 84. The plate 82 also includes a row of apertures 94, positioned between the holes 90 and 92 through which positive air pressure may be applied, e.g. by means of air jets directed from the rear of the plate. A series of hook-like structures 96 extend from the upper plate edge and jointly define the upper lip of the above-mentioned mechanical gate. The lower lip 98 of the aforesaid gate faces the lip 96 and is positioned above the reference plane in fixed relationship to the latter. The forward portion of the lip 98 is concave to accommodate the traversing impelling bar 42, as explained below. The rear of the lip 98 includes an elbow 99. Lips 96 and 98 respectively, converge in a direction away from the plate 82 and terminate abruptly in a common vertical plane. In the raised position of the plate 82, shown in FIGURE 5B, the mutual spacing of the lips 96 and 98 in the common vertical plane is slightly less than the height of a card.

In operation, a desired card deck 10 is placed in position by sliding the support structure 28 in the direction of the arrow 30, as permitted by the roller and rail arrangement 33 and 35. With the deck held in place in the position shown in FIGURE 1, i.e., with the lower card edges 36 spaced above the reference plane, the carriage 28 is slid forward, causing the selection rods 14 to engage the upper card notches 16 and the holding rods 12 to engage the notches 15 in the minor card edges. An air jet applied from the nozzle 52 to the minor card edges 48, tends to keep the cards separated from each other. The plate 19 and the lips 96 and 98, which terminate in the aforesaid common vertical plane, define the limits within which the stacked cards are positioned. As previously explained, the width of the platform 38 spans the distance between these limits.

A card may now be randomly selected from the deck by energizing the solenoid actuators 18 in accordance with the address code of the selected card. The aforesaid code may, for example, be derived from the central processor of the data processing system with which the subject card processing apparatus is associated. The energized actuators 18 rotate the selection rods 14 so as to free the selected card. At this time the actuators 20 are also energized to turn the holding rods 12 and release the card. The selected card drops in the direction of the arrow 51 onto the reference plane. In this position the card straddles the space 41. As previously explained, the lower card edges 36 of the suspended cards are positioned close to the reference plane, a distance sufficient only to permit the impelling bar 42 to pass underneath without interference. Accordingly, the distance of free-fall drop of the card 10*a* is relatively small with respect to the card height, being of the order of ¼ inch in one practical embodiment of the present invention. As seen from FIGURE 1, the selected card 10*a* is supported against tipping by its immediately adjacent suspended cards. The trailing edge 48 of the card 10*a* is positioned immediately in front of the impelling bar 42 in the rest position of the latter.

With the card 10*a* in position as shown in FIGURE 1, the servo motor 48 is energized and the impelling bar 42 rapidly traverses its prescribed path, as determined by the platform 38. Specifically, the bar 42 is accelerated in the forward direction from its rest position and initially moves above the waiting platform 38. During this portion of its travel, one end of the bar is positioned immediately adjacent the conforming concave portion of the lower lip 98. Subsequently the bar 42 moves through the opening 41 and returns below the platform in the opposite direction, until it rises through the opening 40 and comes to rest again in its initial position above the waiting platform. The forward motion of the impelling bar above the platform 38 is imparted to the dropped card which is accelerated in the direction of the arrow 120, as illustrated with respect to the card designated 10*b* in FIGURE 2. The card acceleration is substantially linear and is effected without damage to the trailing card edge 48 which is positioned immediately adjacent to the bar in the rest position of the latter. It will also be noted that, since the dropped card straddles the space 41, the forward portion of the card is already positioned on the working surface 34 at the time the card acceleration is initially applied. Accordingly, the leading card edge 53 cannot snag even if the waiting platform 38 and the working surface 34 are not precisely coplanar.

The attitude of the accelerated card 10*b* thus remains substantially perpendicular to the reference plane as the card moves with its lower edge 36 in contact with the latter plane. The air current applied by the nozzle 52 provides the necessary air film between adjacent cards to serve as a bearing therebetween so as to avoid damage to the sensitive card surface. After the impelling bar 42 reaches the extreme position of its forward path, the accelerated card continues in the same direction under its own momentum. The card changes direction as the leading edge 53 reaches the surface of the guide 50. From a consideration of FIGURE 3, it will be clear that the point in time when the leading card edge reaches the guide 50 will vary in accordance with the position of the selected card in the deck, the cards closest to the lift plate 82 taking longest to arrive at the guide. The sensitive, magnetized surface of the card never makes physical contact with the facing surface of the guide 50. This is due to the fact that sufficient air is drawn between the guide surface and the card to provide an air bearing that is adequate to support the card until it reaches the capstan 54.

When the card arrives at the rotating read capstan 54 it is further accelerated owing to the greater surface speed of the capstan. The card is, however, held in contact with the external capstan surface due to the vacuum pressure applied through the apertures in the latter surface. The card is thus transported past the data transfer station 58, where information is either read into, or out from, a specified track on the magnetized card surface facing the data transfer station. Although the invention is not so limited, in a preferred embodiment the data transfer is carried out with respect to only a single track on each pass of the card past the station 58. The card is retained on the capstan for as many revolutions as there are tracks to be read or written into.

As previously explained, the card extends sufficiently above the guide structures so that the notches 16 make no physical contact with the latter. This is particularly important when a card is on one of the rotating capstans where the centrifugal force tends to flex the card outward in the vicinity of the notches 16. Such outward flexing is difficult to prevent by the use of vacuum pressure alone, because the slots 16 have a tendency to dissipate the vacuum in this area. By letting the card extend above the guide structures, however, the possibility of damage to the notch area of the card is avoided.

While the details of the internal construction of the read capstan are beyond the scope of the present discussion, it is sufficient to state that a gating action is provided whereby vacuum pressure may be selectively withdrawn from a sector 122 of the external capstan surface, in the vicinity of the ridge 62. The control of vacuum pressure in this area may, for example, be effected through the aforesaid central processor of the associated data processing system and may depend on the nature of the information read out at the data transfer station and sent to the central processor. For example, the data read out from one track may cause the central processor to issue read commands with respect to other tracks of the same card, in which case the card is returned. When the card is to be released, the command is given by the central processor to withdraw vacuum pressure from the aforesaid sector 122 of the external read capstan surface. The leading card edge, once it enters the sector 122, is therefore no longer retained in contact with the external read capstan surface. Its own flexibility and centrifugal force action thus cause the card to enter the external raceway 64 and to travel along the latter under its own momentum, imparted to it by the read capstan 54.

Since the card contacts the read capstan with its nonsensitive surface, the magnetized card surface is subject to physical contact only by the magnetic heads of the data transfer station 58 while the card is on this capstan. An air bearing exists in the raceway 64 which similarly prevents aggressive physical contact with the sensitive card surface. This effect may be enhanced by providing openings in the guide plate 27 through which air may be drawn in.

In a preferred embodiment of the invention, the return capstan 68 rotates at a constant surface speed approximately one-half that of the read capstan. Thus, the card arriving by way of the raceway 64 is decelerated, but is held in contact with the external capstan surface owing to the application of vacuum pressure internally of the capstan 68. The vacuum pressure is preferably permanently withdrawn from the return capstan sector 124, so that the card passes directly from the internal raceway 75 to the external raceway 78. It will be clear, however, that the gating action discussed in connection with the read capstan 54 may also be implemented here if it is desired to retain a card on the return capstan for more than one revolution.

The application of an air jet through the pipe 77 to the card emerging from the internal raceway 75, assures that the card arrives at the lift plate 82 parallel to the plate surface 84. The aforesaid air jet further prevents damage to the sensitive card surface in the raceway 78. Once the card has traversed the external raceway 78, it arrives under its own momentum at the plate surface 84. There, the card is arrested, the backstop 86 defining the extreme limit of card travel. The application of vacuum pressure through the holes 90 and 92 serves to retain the card in contact with the plate surface 84.

The relationship of the card held in contact with the plate 82 to the suspended cards in the deck 10 is best seen from FIGURE 5A. The card held in contact with the plate surface is designated 10*c* and it will be seen that the lower card edge is positioned below the elbow 99 of the lip 98.

Upon command, the plate 82 is lifted in a direction normal to the reference plane, the lifting means having been omitted for the sake of simplicity. In this position, which is shown in FIGURE 5B, the hook-like structures 96 pass between the selection rods 14 and extend above the latter. The card 10*c* is now positioned opposite the suspended cards of the deck 10, the card notches 16 engaging the aforesaid relieved portion 17 of the selection rods 14. While not shown in FIGURE 5B, the card notches 15 similarly engage the relieved portions of the holding rods 12 at this time. A jet of air pressure P is now directed from the rear of the lift plate through the apertures 94, as indicated by the arrow 124. The positive air pressure thus applied to the rear surface of the card 10*c* is sufficient to overcome the vacuum pressure applied through the holes 90 and 92, which tends to hold the card in contact with the lift plate surface. The card 10*c* thus moves toward the suspended cards 10, the shelf 88 preventing the card from dropping vertically.

It will be noted that, whereas the shelf 88 was coplanar with the working surface 34 in the position of the lift plate shown in FIGURE 5A, the shelf is at the height of the lip elbow 99 in FIGURE 5B. The card moving in the direction of the arrow P now encounters the constriction of the mechanical gate formed by the lips 96 and 98. The applied air pressure bows the flexible card 10*c* in the direction of the suspended cards 10, sufficiently to cause the upper and lower card edges to pass through the gate. The applied air pressure P continues to act on the card after the gate is passed to blow the card further onto the rods 14 away from the relieved rod portions.

With the card back in the deck 10, a complete card cycle has been completed. In a practical embodiment of the invention the complete cycle, from card selection until card return to the deck, may take of the order of 250 milliseconds. Nevertheless, provided each card executes only a single pass past the data transfer station 58, the present invention may be operated at rates up to 10 cards per second. Clearly, more than one card must simultaneously be in the transport path in order to attain such operaing rates. Thus, it becomes important for the various operations which take place in a single card cycle to be interlocked mutually, so that effective control can be exercised over the progress of each cycling card.

FIGURE 6 illustrates in schematic form the derivation of the various command signals which will aid in forming an understanding of the operation of the present invention. The reference numerals of the appropriate sensing means from which the command signals are originally derived have been retained in FIGURE 6, but are shown in enclosed boxes to indicate that they have been modified, as required for each particular command. The manner in which these signals are modified will appear from their definitions, the circuitry for implementing these modifications forming no part of the present invention.

Figures 6A, 6B:
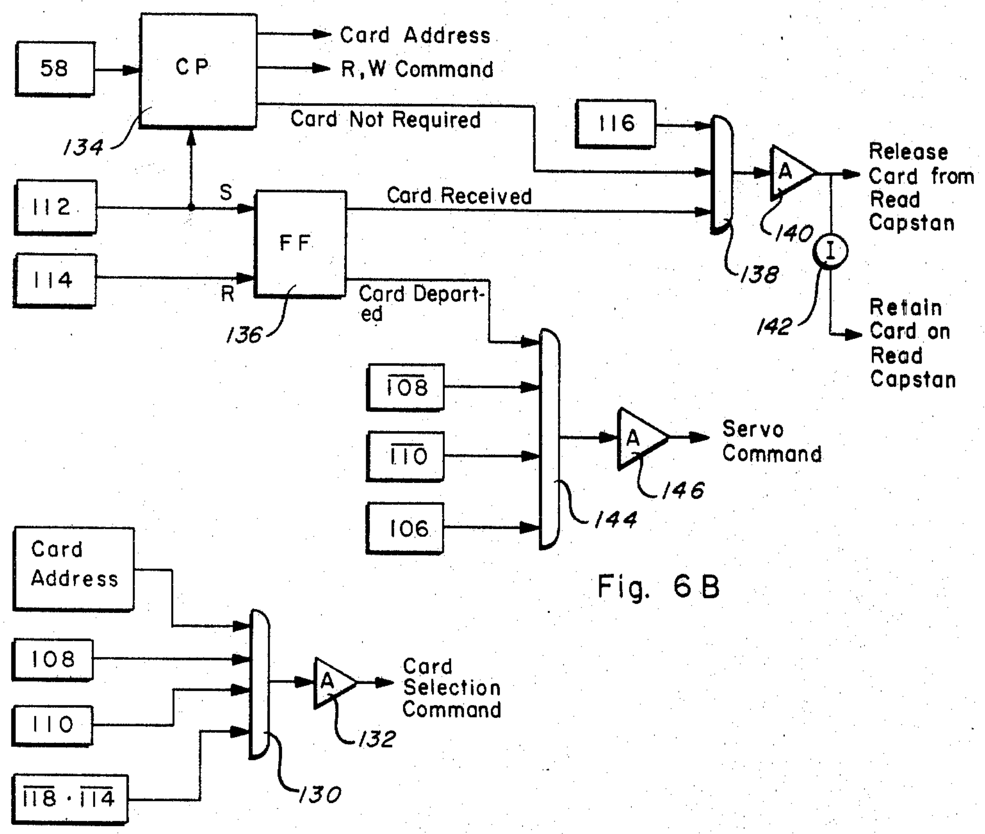
FIGURE 6 illustrates in simplified block diagram form the derivation of certain command signals which will aid in understanding the operation of the present invention.

FIGURE 6A illustrates in schematic form the derivation of a card selection command. As previously explained, the present invention may be operatively associated with a data processing system and may be controlled through the central processor of the latter. A gate

130 receives at one input a modified card address code, which may be derived from the aforesaid central processor. A pair of signals [108] and [110], each indicative of the absence of a card in front of the like-numbered photocell, is coupled to two further inputs of the gate 130. The latter signals jointly indicate that there is no card present on the waiting platform. A further input of the gate 130 receives a signal [$\overline{118 \cdot 114}$]. The latter signal is indicative of the fact that a card is present at the photocell 118 and that the subsequent card is in the path and was sensed by the photocell 114. In such a case, it is necessary to return the earlier card to the rods immediately upon arrival at the lift plate 82 in order to prevent card interference. Since card return to the rods and card selection from the rods may not occur simultaneously, card selection is inhibited in such a case.

It will be noted that the input conditions of the gate 130 are satisfied independently of the completion of a card cycle, the gate output signal being coupled to an amplifier 132, at the output of which a card selection command is obtained. Accordingly, barring the condition defined by the signal [$\overline{118 \cdot 114}$], a card selection operation may take place immediately following the acceleration of the previous card clear of the photocell 110. A card may thus be pre-selected, i.e. upon being addressed, it may be dropped to the waiting platform before the acceleration command is given. An important time saving may thus be achieved, since the free-fall time of the card takes up the single largest time interval of the entire card processing cycle.

FIGURE 6B illustrates in block diagram form circuitry for controlling the operations of the read capstan 54 and of the impelling bar 42. The central processor is illustrated at 134 and receives at one input thereof the signal [58] which is derived from the like-numbered data transfer station. The central processor provides output signals which are designated respectively "Card Address"; "R, W Command"; and "Card Not Required." A flip-flop 136 receives a signal [112] at the set input thereof, such signal being further applied to the input of the central processor 134. A signal [114] is coupled to the reset input of the flip-flop 136.

The assertive and negative outputs of the flip-flop 136 are designated "Card Received" and "Card Departed" respectively and refer to the presence of a card relative to the read capstan 54, as sensed by the photocells 112 and 114. The "Card Received" signal, derived from the output of the flip-flop 136, and the "Card Not Required" signal, derived from the central processor 134, are respectively applied to separate inputs of a gate 138. A signal designated [116] is applied to a further input of the latter gate. In a preferred embodiment of the invention, the photocell 116 is placed 100 milliseconds downstream from the photocell 114 of the expected card velocity. Thus, the signal [116] is indicative of the fact that the previous card has left the read capstan 54 at least 100 milliseconds ago. When the input conditions of the gate 138 are satisfied, an output signal is applied to an amplifier 140 which in turn provides a command to release the card from the read capstan. The output of the latter amplifier is further applied to an inverter 142 whose output signal represents a command to retain the card on the read capstan.

From the foregoing explanation it will be clear that, in order for a card to be released from the read capstan, it must first be established, through the agency of the flip-flop 136, that a card is present on the capstan. The central processor must indicate that this card is no longer required, e.g. when all read or write operations relative there to have been completed. Finally, the previous card must be a predetermined distance downstream before a card release command is issued. In the absence of such a command, the signal to retain the card on the rotating read capstan is active. Once given, the card release command initiates the aforesaid capstan gating action, whereby vacuum pressure is selectively withdrawn from the sector 122 of the read capstan 54. The withdrawal of such vacuum causes the card held on the external capstan surface to be released and to enter the raceway 64.

As explained above, the arrival of a card at the photocell 112 causes the flip-flop 136 to be set, so as to provide an output signal indicative of the fact that a card was received. The presence of a card at the photocell 114 causes the flip-flop 136 to be reset, to provide an output signal indicative of the fact that the previously arrived card has departed. The latter signal is applied to one input of a gate 144, which further receives the signals [$\overline{108}$] and [$\overline{110}$] at separate inputs thereof. The latter pair of signals indicates that a card is present on the reference surface below the selection rods. A further signal, designated [106] and indicative of the presence of the impelling bar 42 in its rest position, is applied to an additional input of the gate 144. The output of gate 144 is coupled to an amplifier 146, at the output of which a servo command is issued.

Thus, in order for the impelling bar 42 to be accelerated, several conditions must concur. First, a card must be present on the waiting platform; secondly, the previous card must have departed from the read capstan 54; and thirdly, the impelling bar must be at its start position. When these conditions concur, a servo command signal is generated at the output of the amplifier 146. The latter signal is applied to the servo motor 49, e.g. through a control servo circuit associated with the latter. In response, the bar 42 traverses one path revolution and then comes to rest again at its initial start position.

Figure 6C:
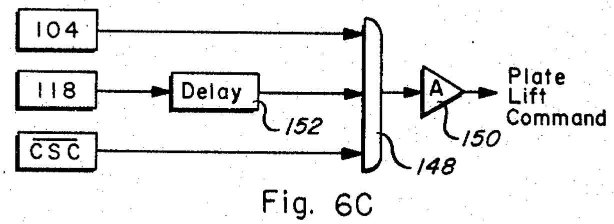

FIGURE 6C illustrates the derivation of a command signal to lift the plate 82. An input signal designated [104], which is derived from the like-numbered sensing switch, is indicative of the normal position of the plate 82 in contact with the working surface 34. The aforesaid signal [104] is coupled to one input of a gate 148, whose output is coupled to an amplifier 150. A signal designated [118] is coupled to another input of the aforesaid gate 148 by way of a delay 152. The period of the delay 152 is chosen such that is is representative of the time interval between the initial occurrence of the signals [118] upon the presence of a card at the like-numbered photocell and the time when the card assumes its final position at the lift plate 82, preparatory to being returned to the rods. A further input of the gate 148 is designated [$\overline{CSC}$] and is indicative of the absence of a card selection command, e.g. as derived from the output oif the amplifier 132 in FIGURE 6A and inverted.

In the presence of a card selection command, the command to lift the plate, which is derived at the output of the amplifier 150, is inhibited. Accordingly, a card arriving at the lift plate under these conditions must await the completion of a card selection before being returned to the rods. Barring the latter condition, however, and with the plate in its normal position, a plate lift command is issued a predetermined time interval after each returning card passes the photocell 118. As previously explained, the plate lifting mechanism is beyond the scope of this application and has been omitted herein.

Figure 6D:
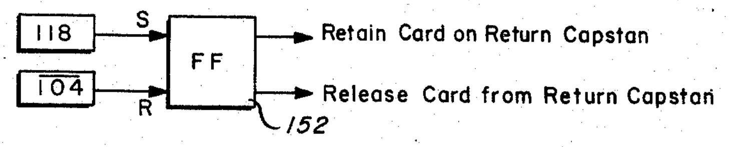

FIG. 6D illustrates a modification of the present invention, whereby cards may be selectively retained on the return capstan 68. As previously explained, more than one card may be simultaneously cycling and it may become desirable to store a card in the return portion of the card path. Such storage capacity in the card path may be desirable because the lifting action of the plate 82 must, at times, await the completion of a card selection command.

In FIGURE 6D, a flip-flop 152 is seen to receive the above-defined signal [118] at its set input. A signal [$\overline{104}$], indicative of the raised position of the lift the plate, is applied to the reset input of the flip-flop 152. When the flip-flop 152 is set by the signal [118], i.e. when a card passes the like-numbered photocell, the assertive flip-flop output signal issues a command to retain the next-arriving card on the return capstan 68. When the plate is raised in order to return the card held thereon to the deck 10, the signal [$\overline{104}$] is generated and resets the flip-flop 152. It is now safe to pass a card on to the lift plate. Hence, the next card to arrive at the capstan 68, or a card which may already be on the capstan 68, is released from the latter. The selective gating of the card on the return capstan may be implemented in similar manner to that described above with respect to the capstan 54, i.e. by selectively withholding vacuum pressure from the sector 124 of the return capstan.

With the above-described invention, far higher card processing rates are attainable than are possible in prior art equipment. Unlike the operation of heretofore available apparatus of this type, such processing rates are achieved without damage to the sensitive card areas, i.e. without harm to the magnetized card surface or to the card notches. Card movement and card position are positively controlled in the present invention, by keeping one of the card edges in contact with reference surface. As a consequence, the reliability of the entire operation is enhanced, both with respect to card movement and with respect to the data transfer. This is the case even though more than one card may be cycling simultaneously. The return of the selected card to its normal storage position similarly takes place rapidly and reliably and without damage to the card so that the card is again ready for selection.

From the foregoing disclosure of the present invention it will be apparent that numerous modifications, departures, substitutions and equivalents will now occur to those skilled in the art all of which fall within the true scope and spirit contemplated by the present invention.

What is claimed is:

1. Apparatus for processing substantially planar, flexible unit records, comprising a substantially horizontal reference plane, at least one propelling bar spanning a first dimension of said reference plane and extending above the latter, said bar being movably adapted to traverse a second dimension of said plane normal to said first dimension and having a predetermined start position, means for suspending a plurality of said unit records adjacent each other above said reference plane a distance sufficient to clear said bar, means for releasing a selected one of said suspended records edgewise onto said reference plane ahead of said start position, said released record being supported by adjacent, suspended records in a position substantially normal to said plane and said bar, rotatable capstan means selectively adapted to retain at least one of said records on a surface thereof, means for selectively actuating said bar to accelerate a released record along said second dimension edgewise along said plane, means for guiding said accelerated record to said capstan means, means for effecting a data trasnfer with respect to a record retained on said capstan surface, a lift plate including a surface in spaced, substantially parallel facing relationship to said suspended records, means for guiding a record from said capstan means to said last-recited surface, means for arresting a record arriving at said plate surface and holding it in contact therewith, means for raising said plate adapted to position a record held by said plate surface opposite said suspended records, and means for moving said last-recited record onto said suspending means.

2. Apparatus for processing substantially planar flexible unit records, comprising a substantially horizontal reference plane, a record storage location including means for suspending a plurality of said unit records adjacent each other above said plane, means for releasing a selected one of said suspended records edgewise onto said reference plane, said released record being supported by adjacent, suspended records in a position substantially normal to said plane, a record processing station, means positioned below said suspended records for accelerating a released record edgewise along said plane in a first direction, means for transporting said accelerated record to said processing station, record return means including a lift plate having a surface spaced in substantially parallel facing relationship from said suspended records, means for transporting a record from said processing station to said last-recited surface, means for arresting a record arriving at said plate surface and holding it in contact therewith, means for raising said plate adapted to position a record held by said plate surface opposite said suspended records, and means for urging said last-recited record onto suspending means.

3. The apparatus of claim 2 and further including a working surface defining said reference plane, a waiting platform spaced from said working surface in said plane and including at least a surface portion lying in said plane, said record accelerating means including a propelling bar spanning the width of said waiting platform and adapted to pass through the spaces between the latter and said working surface, said propelling bar being movably adapted to traverse the length of said platform above said plane and to return below the latter to an initial rest position thereabove, said record suspending means being adapted to position said records beyond said rest position at a height sufficient to clear said bar and normal thereto, said suspended records being stacked within the projected width of said platform and straddling the space between said working surface and said platform lengthwise of the latter, and means for selectively actuating said bar to cause it to traverse its path before returning to said rest position.

4. The apparatus of claim 3 wherein each of said unit records consists of a substantially rectangular card having a coded series of notches of predetermined configuration along a major edge thereof, said suspending means including rotatable rods of predetermined cross section adapted to engage said notches and to suspend said cards, means for receiving a coded input signal, and means responsive to said signal for turning said rods to release a selected one of said suspended cards, said notched card edge being positioned at a height above said reference plane sufficient for said notches to remain clear of aggressive mechanical contact when said card travels edgewise along said plane.

5. The apparatus of claim 4 and further including means positioned ahead of said rest position for providing an air current at least periodically pointed at said suspended cards in said first direction, said air current being adapted to keep said suspended cards mutually separated, and a pair of outer limits defining the maximum mutual spacing of the end cards of said stacked, suspended cards.

6. The apparatus of claim 2 wherein said processing station includes a first rotatable capstan normal to said reference plane, said first recited transport means comprising a guide positioned to enable an accelerated record to arrive under its own momentum at said first capstan, a second capstan normal to said plane, each of said capstans being adapted to hold a record on its external surface by means of internally applied vacuum pressure, said first capstan being adapted to rotate at a surface velocity greater than the velocity of said accelerated record, means selectively operative to release a record held by said first rotating capstan at the surface speed of the latter and in a direction substantially opposite to said first direction, a raceway adapted to guide a record from said first to said second capstan, means for providing an air bearing in said raceway, said second capstan being adapted to rotate at a surface velocity less than the velocity of a record arriving through said raceway, and means for releasing a record from said second capstan in said first direction.

7. The apparatus of claim 6 wherein said last-recited release means include guide means comprising a surface at least partially parallel to said lift plate and substantially tangential to said second capstan at the point of card release, and means for applying a jet of air through said last-recited surface to a card leaving said second capstan.

8. The apparatus of claim 2 and further including a mechanical gate positioned between said lift plate and said record storage location, said gate defining a gradual constriction of abruptly limited extent in the path of a record held by said arresting plate, said record urging means including means for applying positive air pressure in the direction of said record storage location to a record held by said plate, the application of said positive air pressure being adapted to force said record through said constriction by bowing it in the direction of said storage location.

9. The apparatus of claim 8 wherein said gate comprises first and second horizontal lips terminating in a common plane normal to said reference plane, said lips being vertically spaced from each other in said common plane and flaring outward therefrom in the direction of said plate surface, said first lip being fastened to said reference plane, said second lip being affixed to the upper portion of said plate so as to move with the latter.

10. Apparatus for processing substantially planar flexible unit records, comprising a working surface defining a substantially horizontal reference plane, a waiting platform spaced from said working surface in said plane and including at least a surface portion lying in said plane, at least one propelling bar spanning the width of said waiting platform and adapted to pass through the spaces between the latter and said working surface, said propelling bar being movably adapted to traverse the length of said platform above said plane and to return below the latter to an initial start position thereabove, means for suspending respective ones of a plurality of adjacently stacked records substantially at right angles to said plane and to said bar, said records being suspended above said plane past said start position at a height sufficient to clear said bar and being stacked within the projected width of said platform, said suspended records straddling the space between said working surface and said platform lengthwise of the latter, means for dropping a selected one of said suspended records edgewise onto said plane to a position where it is supported by adjacent, suspended records, and means for actuating said bar to impart a rectilinear acceleration to said dropped record edgewise in said plane.

11. The apparatus of claim 10 wherein each of said unit records consists of a substantially rectangular card having a coded series of notches of predetermined configuration along a major edge thereof, said suspending means including rotatable rods of predetermined cross section adapted to engage said notches and to hold said cards, means for receiving a coded input signal, and means responsive to said signal for turning said rods to release a selected one of said suspended cards.

12. The apparatus of claim 11 and further including means positioned ahead of said start position for providing an air current at least periodically pointed at said suspended cards in said first direction, said air current being adapted to keep said suspended cards mutually separated, and means for confining the end cards of said stacked, suspended cards within said projected platform width.

13. Apparatus for processing substantially planar, flexible unit records, comprising a record processing station, means for transporting a record from its normal storage location to said processing station, a lift plate having a perforated surface spaced from said suspended records in substantially parallel facing relationship and including a shelf normal to said surface, means for transporting said record from said processing station to said plate surface into edgewise contact with said shelf, means for applying vacuum pressure through the perforations in said plate surface to hold said record in contact therewith, means for lifting said plate to position said record opposite said normal storage location, and means for urging said last-recited record into said normal storage location.

14. The apparatus of claim 13 and further including cantilevered pairs of spaced flexures having their free ends affixed to opposite sides of said plate, said flexures permitting a lifting motion of said plate wherein said plate surface is substantially translated.

15. The apparatus of claim 13 and further including a mechanical gate positioned in the record path between said lift plate and said normal storage location, said gate defining a gradual constriction of abruptly limited extent, said record urging means including means for applying positive air pressure in the direction of said record storage location adapted to apply a force to a record held by said plate, the application of said force being adapted to push said record through said constriction by bowing it in the direction of said storage location.

16. The apparatus of claim 15 wherein said gate comprises first and second horizontal lips terminating in a common plane normal to said reference plane, said lips being vertically spaced from each other in said common plane and flaring outward therefrom in the direction of said plate surface, said first lip being fastened to said reference plane, said second lip being affixed to the upper portion of said plate so as to move with the latter.

17. The apparatus of claim 13 wherein said processing station includes a first rotatable capstan normal to said reference plane, a second rotatable capstan spaced from said first capstan and normal to said plane, each of said capstans being adapted to hold a record on its external surface by means of internally applied vacuum pressure, said first capstan being adapted to rotate at a surface velocity greater than the velocity of said accelerated record, means selectively operative to release a record held by said first rotating capstan at the surface speed of the latter in a first direction, a raceway adapted to guide a record from said first to said record capstan, means for providing an air bearing in said raceway, said second capstan being adapted to rotate at a surface velocity less than the velocity of a record arriving through said raceway, and means for releasing a record from said second capstan in a direction substantially opposite to said first direction.

18. The apparatus of claim 17 wherein said last-recited release means include guide means including a surface at least partially parallel to said lift plate and substantially tangential to said second capstan at the point of record release, and means for applying a jet of air through said last-recited surface to a record leaving said second capstan.

19. Apparatus for processing substantially planar, flexible unit records, comprising a substantially horizontal reference plane, means for suspending a plurality of said unit records in stacked arrangement above said plane normal thereto, means selectively operative for dropping a chosen one of said suspended records edgewise onto said plane, said dropped record being supported against tipping by adjacent, suspened records, means selectively operative for accelerating said dropped record edgewise along said plane, a record processing station, means independent from said accelerating means for transporting said accelerated record to said processing station, and means for returning said record from said processing station to said suspending means.

20. The apparatus of claim 19 and further including first sensing means for signaling the arrival of a record at said processing station, second sensing means for signaling the departure of a record from said processing station, bistable means connected to be energized by said first and second sensing means and adapted to be set or reset in accordance with the arrival or departure respectively of a record relative to said processing station, third sensing means for signaling the presence of record selectively dropped from said suspending means, and means responsive to the concurrence of a record signal from said third sensing means and the reset state of said bistable means for actuating said record accelerating means.

21. The apparatus of claim 19 wherein said record processing station includes data transfer means, means for retaining said record at said processing station, means responsive to externally derived signals for releasing said record from said processing station, first sensing means for signaling the arrival of a record at said processing station, second sensing means for signaling the departure of a record from said processing station, bistable means connected to be set or reset in accordance with signals derived respectively from said first or second sensing means, third sensing means for signaling the presence of a selectively dropped record, means including said third sensing means indicative of the acceleration of said selectively dropped record clear of said suspended records, means adapted to respond immediately upon the termination of said record present signal to actuate said record dropping means in accordance with said externally derived signals, if any, to drop the next selected record to a position awaiting action by said accelerating means, and means responsive to the concurrence of said record present signal and the reset state of said bistable means to initiate the actuation of said accelerating means.

22. The apparatus of claim 19 wherein said record processing station includes data transfer means, a rotatable capstan normal to said reference plane and adapted to hold a record on its external surface by means of internally applied vacuum pressure, means for rotating said capstan at a predetermined surface velocity repeatedly adapted to transport the record held on said capstan surface past said data transfer means, means responsive to said externally derived signals for releasing said record from said capstan surface, first sensing means for signaling the arrival of a record at said capstan, second sensing means for signaling the departure of a record from said capstan, bistable means connected to be set or reset in accordance with signals derived respectively from said first or second sensing means, said record accelerating means comprising a bar having a rest position immediately ahead of the trailing edge of a selectively dropped record and normal thereto, said bar being cyclically adapted to traverse a limited length of said reference plane between the latter and said suspended records and to return below said plane to said rest position, third sensing means for signaling the presence of said bar at said rest position, fourth sensing means for signaling the presence of a selectively dropped card, said fourth sensing means positioned such that the termination of a record present signal is indicative of the movement of an accelerated record clear of said suspended records, means adapted to respond immediately upon the termination of said record present signal to actuate said record dropping means in accordance with said externally derived signals, if any, to drop the next selected record to a position awaiting action by said bar, and means for initiating the actuation of said bar upon the resetting of said bistable means in the presence of simultaneously occurring signals derived from said third and fourth sensing means.

23. The apparatus of claim 22 wherein said return means include a second rotatable capstan normal to said plane and spaced a predetermined distance from said first capstan, a raceway between said capstans adapted to guide said records, said second capstan being adapted to hold a record on its external surface by means of internally applied vacuum pressure, means for rotating said second capstan at a predetermined surface velocity less than that of said first capstan, a lift plate including a surface spaced in substantially parallel facing relationship from said suspended records, means for transporting a record from said second capstan into contact with said plate surface, means for arresting record arriving at said plate surface and holding it in contact therewith, means for lifting said plate in a direction normal to said plane to move a record held on said plate surface opposite said suspended records, means for urging said last-recited record onto said record suspending means, said lifting means being adapted to lower said plate to its normal position upon attaining a predetermined height above said plane, fifth sensing means for signaling the presence of a card at a predetermined point on said plate surface, and means responsive to a signal from said fifth sensing means for initiating the lifting action of said plate a predetermined time interval thereafter.

24. The apparatus of claim 23 and further including means responsive to said fifth sensing means to control the release of a record retained on the surface of said first-recited capstan.

25. The apparatus of claim 23 and further including means for selectively releasing a record held by said second capstan surface.

26. The apparatus of claim 23 and further including sixth sensing means for signaling the presence of a record at a predetermined point in its return path, and means responsive to said last-recited sensing means to control the release of a record retained on the surface of said first-recited capstan.

27. Apparatus for transporting records in the form of substantially rectanguler, flexible tape strips along a predetermined path, comprising a substantially horizontal reference plane, means for suspending a plurality of said records adjacent each other normal to said plane, the lower major edge of each suspended record being parallel to said plane and spaced above the latter a distance which is small relative to the length of a minor record edge, means responsive to externally derived signals for releasing a selected one of said suspended records, a wait station in said reference plane, said selected record dropping freely to said wait station in translational motion substantially in the plane of its suspension, said selected record at said wait station resting with said lower major edge in said reference plane and being supported against tipping by adjacent suspended records, an accelerating bar normally residing at a start position immediately preceding a minor edge of said record at said wait station, said bar being selectively adapted to traverse a predetermined linear length in a first direction between said suspended records and said reference plane and substantially parallel to both, said traversing bar bearing against said minor edge of said selected record to impart a translational acceleration to the latter in the same direction, said acceleration being adapted to carry said record past a first predetermined point clear of said adjacent, suspended records, means responsive to the movement of said accelerated record clear of said adjacent records adapted to initiate the release of the next record selected in accorddance with said externally derived signals, and means responsive to the passage of said first-recited record of a second predetermined point, beyond said first point in said path, to initiate the traversing action of said bar relative to said next-selected record.

28. The apparatus of claim 27 and further including a lift plate having a surface spaced from said suspended records in facing relationship therewith and substantially parallel thereto, said lift plate including a shelf normally positioned substantially co-planar with said reference plane, a data transfer station positioned in a portion of said record path between said wait station and said lift plate, means for transporting a record along said path portion with its lower major record edge in contact with said reference plane, said plate being adapted to arrest an arriving record and retain it in contact with said plate surface, said last-recited edge of said retained record contacting said shelf, means for raising said plate to lift said retained record translationally in a plane normal to said reference plane, and means effective when said lifted record is substantially opposite said suspended records for imparting translational motion to said lifted record in a direction normal to said lifting motion and parallel to said reference plane, adapted to position said record on said suspending means.

29. The apparatus of claim 28 wherein said data transfer station includes a first vacuum capstan adapted to hold a record on its external surface, means for releasing a record held by said first capstan in a direction substantially opposite to said first direction, a second vacuum capstan positioned in said portion between said first capstan and said arresting plate and adapted to hold a record on its external surface, and means for releasing a record held by said second capstan substantially in said first direction.

30. Apparatus for processing strip-like, flexible records, comprising a record path wherein said records are transported normal to a reference plane substantially in edgewise contact therewith, first and second vacuum capstans positioned in said path normal to said plane and spaced from each other, each of said capstans being adapted to retain a record on its external surface, means for rotating said first capstan at a surface velocity greater than the velocity of a record arriving at its surface, means for sensing the position of a record in said path relative to said first capstan, means responsive to said sensing means for selectively releasing a record held on the external surface of said first capstan, means for guiding said released record to said second capstan, and means for rotating said second capstan at a surface velocity less than the velocity of a record arriving at its surface.

31. The apparatus of claim 30 and further including second sensing means for signaling the presence of a record on said first capstan surface. and means responsive to said first and second sensing means for selectively releasing a record held on said second capstan surface.

32. Apparatus for processing substantially planar flexible unit records each having a sensitive and a non-sensitive surface, comprising a reference plane, means for suspending a stack of said records above said plane at a distance less than the height of said records, means for transporting said records in a position substantially normal to said plane in a path closing on said stack and free of aggressive contact with said sensitive record surface, said transport means including means for dropping a selected record from said stack edgewise onto said plane, said dropped record being supported against tipping by adjacent suspended records, means positioned below said suspended records for accelerating said dropped record edgewise along said plane in a first direction to cause it to emerge from said stack, first and second capstans spaced from each other each having an axis normal to said plane, each of said capstans including an external surface adapted to retain a record thereon, means for rotating said first capstans, first guide means for deflecting said forwardly accelerated record to cause it to arrive at said rotating first capstan under its own momentum with said non-sensitive surface in contact with said external capstan surface, second guide means positioned between said first and second capstans, means for releasing said record from said rotating first capstan in a manner propelling said record in a direction opposite to said first direction along said second guide means to cause it to arrive at said second capstan under its own momentum, a lift plate having a surface disposed in spaced, parallel facing relationship to said suspended records, third guide means positioned between said second capstan and said plate, means for releasing said record from said rotating second capstan in a manner propelling it in said first direction along said third guide means to cause said non-sensitive record surface to contact said plate surface, means for arresting said record and retaining it in contact with said plate surface, means for lifting said plate to position said record opposite said record suspending means, and means for moving said record onto said suspending means.

33. Apparatus for processing substantially planar, flexible unit records comprising, a reference plane, an accelerating bar spanning a first dimension of said reference plane and extending above the latter, means for selectively accelerating said bar from a predetermined start position to traverse a second dimension of said reference plane at right angles to said first dimension, means for normally suspending a plurality of said records adjacent each other and above said reference plane a distance sufficient to clear said accelerating bar, means for releasing a selected one of said suspended records edgewise onto said reference plane, said released record being supported against tipping by adjacently suspended records and being positioned ahead of the start position of said accelerating bar substantially at right angles to the latter, at least first and second capstans spaced from each other in said reference plane with the axis of each normal to said plane, means for rotating said capstans, each of said capstans being able to retain at least one of said records on its external surface, said released record being impelled by said accelerating bar along said second dimension and edgewise in said plane, means adapted to guide said impelled record under its own momentum to said first rotating capstan, means for effecting a data transfer relative to said record while the latter is retained by said rotating first capstan, means for releasing said record from said first rotating capstan, means for guiding said record under its own momentum from said first to said second rotating capstan edgewise in said plane, a lift plate having a surface substantially parallel to said suspended records and spaced therefrom, said lift plate including a shelf normally positioned substantially co-planar with said reference plane, means for releasing said record from said rotating second capstan, means for guiding said record under its own momentum from said second rotating capstan into parallel contact with said plate surface and into edgewise contact with said shelf, means for arresting said record at said plate surface and retaining it in contact with the latter, means for selectively lifting said plate to bring the record retained thereon opposite said record suspending means, and means for returning said lifted record to said plurality of records by forcing it from said arresting plate onto said suspending means.

References Cited

UNITED STATES PATENTS

| | | | |
|---|---|---|---|
| 2,463,747 | 3/1949 | Connor | 129—16.1 |
| 2,642,066 | 6/1953 | Page | 129—16.1 |
| 3,105,593 | 10/1963 | Fredkin | 129—16.1 |
| 3,266,497 | 8/1966 | Bleiman | 129—16.1 |
| 3,292,631 | 12/1966 | Cross | 129—16.1 |
| 3,307,557 | 3/1967 | Shebanow | 129—16.1 |
| 3,308,830 | 3/1967 | Irasek | 129—16.1 |

STANLEY M. URYNOWICZ, Jr., Primary Examiner
VINCENT P. CANNEY, Assistant Examiner U.S. Cl. X.R.

209—110